United States Patent
Baina et al.

(10) Patent No.: US 6,823,009 B1
(45) Date of Patent: Nov. 23, 2004

(54) METHOD FOR EVALUATING THE DEGRADATION OF A VIDEO IMAGE INTRODUCED BY A DIGITAL TRANSMISSION AND/OR STORAGE AND/OR CODING SYSTEM

(75) Inventors: Jamal Baina, Nancy (FR); Pierre Bretillon, Metz (FR)

(73) Assignee: Teledifusion de France, Paris (FR)

( * ) Notice: Subject to any disclaimer, the term of this patent is extended or adjusted under 35 U.S.C. 154(b) by 0 days.

(21) Appl. No.: 09/543,924

(22) Filed: Apr. 6, 2000

Related U.S. Application Data (63) Continuation of application No. PCT/FR98/02100, filed on Oct. 1, 1998.

(30) Foreign Application Priority Data

Oct. 6, 1997 (FR) .......................................... 97/12414

(51) Int. Cl.$^7$ .............................................. H04N 7/12
(52) U.S. Cl. ............................ 375/240.12; 375/240.04; 375/240.06
(58) Field of Search ........................ 375/240.12, 240.01, 375/240.04, 240.06, 240.18, 240.22; 382/253

(56) References Cited

U.S. PATENT DOCUMENTS

| | | | |
|---|---|---|---|
| 3,971,888 A | 7/1976 | Ching et al. ........... | 325/240.08 |
| 5,214,508 A | 5/1993 | Stevens | |
| 5,231,484 A * | 7/1993 | Gonzales et al. ....... | 375/240.04 |
| 5,515,105 A * | 5/1996 | Lim ....................... | 375/240.04 |
| 5,574,500 A | 11/1996 | Hamada et al. | |
| 5,579,050 A | 11/1996 | Jung ..................... | 325/240.14 |
| 5,650,860 A * | 7/1997 | Uz ........................ | 382/253 |
| 6,141,448 A | 10/2000 | Khansari et al. ........ | 382/236 |
| 6,256,413 B1 | 7/2001 | Hirabayashi ............ | 382/232 |

FOREIGN PATENT DOCUMENTS

| | | |
|---|---|---|
| EP | 0620685 A2 | 4/1994 |
| WO | PCT93/00278 | 9/1993 |
| WO | PCT94/01558 | 2/1995 |
| WO | WO 96/01023 | 1/1996 |

OTHER PUBLICATIONS

Ricardo de Queiroz, C.K. Choi, Young Huh, and K.R. Rao, Wavelet Transforms in a JPEG–Like Image Coder, IEEE Transactions on Circuits and Systems For Video Technology, vol. 7, No. 2, Apr. 1997.

Rudolph Mester and Uwe Franke, Spectral Entropy–Activity Classification in Adaptive Transform Coding, IEEE Journal on Selected Areas in Communications, vol. 10, No. 5, Jun. 1992, pp. 913–917.

G. Beakley, C. Cressy, and J. Van Pelt, Video Compression: The Need for Testing, 8012 SMPTE Journal, Nov. 1995, No. 10, White Plains, NY.

* cited by examiner

*Primary Examiner*—Chris Kelley
*Assistant Examiner*—Allen Wong
(74) *Attorney, Agent, or Firm*—Michael Best & Friedrich LLP (57) ABSTRACT

The invention concerns a method for assessing the degradation of a video image coded by blocks of picture elements or pixels, comprising the following steps: a) selecting an input image and determining its spatial activity (SA) in an analysis window according to the following sub-steps: i) determining for each block (n, m) the transformed coefficients Fn m (i, y) by a block transform; ii) determining from the transformed coefficients Fn, m (i, y) each block spatial activity bsa; iii) determining the analysis window global spatial activity $SA_1$; b) selecting the output image corresponding to the input image and determining said global spatial activity $SA_2$ of the output image; c) comparing the spatial activities ($SA_2$) and ($SA_1$)

12 Claims, 3 Drawing Sheets

METHOD FOR EVALUATING THE DEGRADATION OF A VIDEO IMAGE INTRODUCED BY A DIGITAL TRANSMISSION AND/OR STORAGE AND/OR CODING SYSTEM

CROSS REFERENCE TO RELATED APPLICATIONS

The present application claims on of the benefit and priority of prior international application PCT/FR98/02100, filed on Oct. 1, 1998, and FR Application No. 97/12414, filed Oct. 6, 1997.

FIELD OF THE INVENTION

The subject of the present invention is a method for evaluating the degradation of a video image introduced by a coding and/or storage and/or digital transmission system, particularly a system employing digital video signal transmission and/or storage and/or coding with a low throughput.

BACKGROUND OF THE INVENTION

The degradation is generally due to the errors introduced by the throughput-reduction algorithms and/or by defective transmission links or even to defects in the coders and decoders.

The digitizing of video signals has opened the possibility of being able to copy, store or transmit the video information while maintaining constant quality.

However, the large amount of information transported by the video images in practice requires the use of digital compression methods in order to reduce the binary throughput.

One compression method which is very widespread in the video field is described in the ISO/CEI 13918 MPEG2 standard. This algorithm is said to be of the "lossy" type, since the image reproduced after decoding is not identical to the original. In order to maintain quality which is acceptable to the final viewer, the throughput-reduction algorithms take account of the perceptual properties of the human system of vision. Despite that, the constraints imposed, of throughput or of available bandwidth for the transmission, as well as the content of the video signal, imply the appearance of characteristic degradation in the signal after decoding. This degradation, introduced by the system, for example MPEG2, has a direct influence on the perceived quality of the final image.

Automatic evaluation of the quality of audio-visual signals has a wide range of applications in the digital television system: production, distribution and evaluation of the performance of the systems.

Furthermore, the existing devices were derived for laboratory tests and are not suitable for remote monitoring of the distribution networks.

Sequences of MPEG-coded images transmitted at low data rate for broadcasting digital television or for other multimedia applications will exhibit a certain number of defects or deformations with respect to the original sequence. In fact, a non-exhaustive list of visible degradations could be drawn up. Those of them which are most perceptible are granular errors, deformation of contours, losses of information, the "exotic" contours, block effects, etc. However, small-scale transmission errors may be conveyed by more or less localized effects on the image. In the event of a significant disturbance, they may be expressed as difficulties of access to the information, for example breaks in service or freezing of images for a longer or shorter time depending on the disturbance. The scope of the errors depends on the level of relevance and of the structure of the data which they affect: synchronization words, movement vectors, images coded with or without prediction or basic images for the predictions. In addition to breaks or freezing of images, the degradation observed is expressed as blocks or macroblocks which are erroneous or incorrectly positioned. This has the effect of propagating the degradation over the entire video sequence up to the image coded without prediction, hence coded independently of the others.

One evaluation method has already been proposed by the NTIA (National Telecommunications and Information Administration) in the article by A. A. WEBSTER and Colleagues, entitled "An objective video quality assessment system based on human perception" and published in June 1993 in the magazine SPIE, vol. 13, p. 15–26.

This method employs an analysis of the degraded images and of the original images, after they have been filtered by two vertical and horizontal SOBEL operators (3×3 matrices). The filtered image is obtained by convolution, by making the SOBEL matrices slide horizontally and vertically, and the results obtained represent the vertical and horizontal gradients of the image. In other words, the filtered image highlights the vertical and horizontal contours contained in the initial (unfiltered) image.

A measurement based on this information makes it possible to highlight the change in content between the input to the video system and its output.

The method proposed by the NTIA employs two parameters:

on the one hand, the spatial information SI which represents the standard deviation measured on the pixels of the filtered image via the SOBEL operator. It is a question here of determining the standard deviation at the level of the contours of the filtered image, considering that the contours are important for viewing and that they are affected by the various processing operations of the throughput-reduction digital systems;

on the other hand, the time-based information TI which represents the standard deviation of the difference image between two successive images, this standard deviation being calculated on the basis of the differences between the values of the same pixels of two successive frames. The parameter TI may reveal a jerky movement due to a defect in the coder.

The method proposed by the NTIA employs a comparative calculation of the parameters SI and TI over the digital video signal, between an input image and an output image of a system.

This method exhibits a certain number of drawbacks.

The SOBEL filter conserves only certain frequencies of the image which make it possible to take account of the loss of contours, which means that the loss of definition which could be taken into account is that which is situated in the range of frequencies conserved. In other words, the loss of definition can be only partially taken into account.

Moreover, the parameter SI takes account of defects which tend to compensate out. In fact, the loss of information from the image tends to make the parameter SI diminish, whereas the false contours and the block effects tend, in contrast, to make it increase, which means that the parameter SI is meaningful only if one or other of the phenomena is dominant.

Finally, the method of calculating the SI and TI parameters, by using a standard deviation calculated in overall terms on the entire image, drastically reduces the impact on these parameters of localized degradations.

SUMMARY OF THE INVENTION

The subject of the present invention is a method which allows the abovementioned defects to be at least partially remedied.

The method according to the present invention makes use of a block transform, for example the discrete cosine transform used particularly in the MPEG standard, in order to highlight the characteristic signatures of the defects identified. This original approach makes it possible not only to make fine measurements on the errors introduced, but also makes it possible to take account of the initial content of the video signal and of the algorithms employed in MPEG.

The block transformations of an image (Fourier transform, discrete cosine transform DCT, etc.) are obtained via the operation:

[Fn,m]=[T].[fn,m].[T]$^t$ in which f(x,y) designates the image block to be transformed and T(x,y) the matrix of the transformation. Another block transform is produced on the basis of the wavelet-transform of the image, by reorganizing the wavelet coefficients in such a way as to obtain transformed blocks having the desired size, and in particular of the same size as the blocks obtained by the abovementioned methods. Such a method of reorganization is set out in the article by R. de QUEIROZ and Colleagues, entitled "Wavelet transforms in a JPEG-like Image Coder", published in April '1997 in the magazine IEEE Transactions On Circuits and Systems for Video Technology, vol. 7 no. 2 p. 419–424.

The basic idea of the invention is, in particular, to carry out calculations on the blocks according to which the transmitted image was coded, in such a way as to generate a meaningful parameter exempt from the block effect.

The invention thus relates to a method of evaluating the degradation of a video image coded by blocks of image points or pixels, this degradation being generated by a coding and/or storage and/or transmission system producing an output image on the basis of an input image, characterized in that it includes the following stages:

a) selecting an input image and determining a spatial activity (SA) of the input image in an analysis window representing at least one part of the image which exhibits a set of said blocks of image points or pixels, this determination implementing the following sub-stages:

i) determining, for each block (n,m) of the said set of blocks of pixels, the transformed coefficients Fn,m (i,j) via a block transform according to the said blocks ii) determining, on the basis of the transformed coefficients Fn,m (i,j), the spatial activity bsa of each block of the said set of blocks of pixels iii) determining, on the basis of the spatial activity of bsa of each block, the overall spatial activity $SA_1$ of the set of the blocks of pixels constituting the analysis window b) selecting the output image corresponding to the input image and determining the said overall spatial activity $SA_2$ of the output image in the said analysis window, by implementing sub-stages a i) to a iii)

c) comparing the overall spatial activity ($SA_2$) of the output image in the analysis window and the overall spatial activity ($SA_1$) of the input image in the analysis window.

The spatial activity bsa of a block (n,m) can be obtained by the following formula:

$$bsa_{n,m} = \left( \sum_{i=0}^{7} \sum_{j=0}^{7} F_{n,m}^2(i,j) \right) - (F_{n,m}^2(0,0))$$

The spatial activity bsa can be obtained as indicated above by combining the squares of the components of the image on the basis of nearly all the components of the DCT. Any other function for combining the components of the transform used is applicable for characterizing the content of the image. A more general function is:

$$bsa_{n,m} = \left( \sum_{i=0}^{7} \sum_{j=0}^{7} (k(i,j) \cdot F_{n,m}(i,j))^p \right) - (k(0,0) \cdot F_{n,m}(0,0))^p$$

in which k(i,j) is a constant coefficient for weighting the component i,j used, and p is a constant.

There are several options for choosing the constants k(i,j), and the choice of one or the other is made on the basis of the application sought. In fact, the function k(i,j) is chosen depending on the characteristic to be brought to the fore: taking account of the visual system or extracting a part of the relevant information. The following cases are proposed:

1) method number one is to be used when good correlation with human perception is favoured.

The values of the constants k(i,j) are initialized as a function of the relative importance of the coefficients of the transform for the human eye, particularly its frequency sensitivity, so as to supply an activity parameter representative of what is perceived. For example, in the case of the DCT, k(i,j)=1/Q(i,j) is taken. The Q(i,j) are the components of the quantization matrix exploited for the throughput reduction, set out in the following document which is extracted from the MPEG-2 standard: ISO/IEC CD 13818-2: "Information technology—Generic coding of moving pictures and associated audio information—Part 2: video", December 1993, p. 45, § 6.3.7.

2) the second method is used when the coefficients affected by the compression for example the DCT coefficients are identifiable. The constants k(i,j) are chosen in such a way as to eliminate certain coefficients of the transform used. In fact, the weighting k(i,j) is used in order to retain the coefficients which are most affected or sensitive to a given degradation. This involves a binary matrix allocating zero to the coefficients to be eliminated and one to the relevant coefficients. The selection is based either (a) on the position of the coefficient in the matrix, for example DCT matrix, or (b) on its average amplitude:

a) the coefficients corresponding to the high spatial frequencies are often the most affected by compression. An example of a weighting matrix depending on the placing of the DCT coefficient for example is given in the table below:

| 0 | 0 | 0 | 0 | 1 | 1 | 1 | 1 |
|---|---|---|---|---|---|---|---|
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 | b) certain low-amplitude coefficients are brought down to zero during the compression stage.

In order to choose these coefficients, a weighted average of each of the coefficients over the image region analyzed (of size M.N blocks) is formed:

$$avCoef(i, j) = \sum_{m=1}^{M}\sum_{n=1}^{N}\left|\frac{F_{n,m}(i, j)}{Q(i, j)}\right|,$$

where Q(i,j) is defined as above, at 1).

The coefficients the averages of which are among the 48 lowest values are adopted. For these values, k(i,j)=1, and for the others k(i,j)=0.

In the case of the "spatial activity" parameter, k(i,j)=1 is set, and p=2 for the rest of the document relating to the description of the figures.

The overall spatial activity SA of the set of blocks can then be determined by the following formula:

$$SA = \overline{bsa_{n,m}} = \frac{1}{H \times W}\sum_{n=0}^{H-1}\sum_{m=0}^{W-1}bsa_{n,m}$$

(H×W) representing the number of blocks of pixels in the analysis window.

The said comparison (stage c) is advantageously carried out with the aid of the parameter LR defined in the following way:

$LR=g_j[f_i(SA_1,SA_2)]$ with $i,j \in \{1,2\}$ with $f_1(x,y)=x-y$ or $f_2(x,y)=x/y$ and $g_1(x)=100.|x|$ or $g_2(x)=100.|\log(|x|)|$ and, for example: $LR=\log_{10}(SAe/SAs)$.

The method may then be characterized in that it performs the calculation of the parameter LR over a sequence of M input images and of M corresponding output images, and in that it performs the calculation of an evaluation parameter or quality score MLR defined in the following way:

$MLR=\text{maximum}_m(LR)$

The method may advantageously be characterized in that it includes the determination of a time-based activity indicator TA for a group of M images, determined in the following way:

$$TA = \sqrt{\sum_{u=1}^{M-1} F_{SA}^2(u)}$$

$F_{SA}(u)$, for u varying from 0 to M−1, designating the M coefficients of a block transform, for example a discrete cosine transform, applied to M time-based samples of the spatial activity SA.

The method may be characterized in that it includes the following stages, with a view to determining the block effect:

d) determining the spatial activity $SA_{d1}$, of the input image in an offset analysis window exhibiting blocks of image points or pixels which are offset by at least one pixel in the direction of the lines of the image and/or in a direction perpendicular to the direction of the lines of the image with respect to the said blocks of pixels of the said analysis window, this determination implementing the following sub-stages i) applying the said block transform to each offset block (n,m) of the said set of blocks of pixels of the offset analysis window in order to determine the transformed coefficients $F_d$n,m (i,j), ii) determining, on the basis of the transformed coefficients $F_d$n,m (i,j) of the offset blocks, the spatial activity $bsa_d$ of each block of the said set of offset blocks, iii) determining the overall spatial activity $SA_{d1}$, of the set of offset blocks constituting the offset analysis window, e) determining the overall spatial activity $SA_{d2}$ of the output image in the said offset analysis window by implementing sub-stages d i) to d iii) for the output image f) comparing, on the one hand, the overall spatial activity $SA_{d2}$ of the output image in the offset analysis window and the overall spatial activity $SA_2$ of the output image in the analysis window, in order to evaluate the block effect in the output image and, on the other hand, the spatial activity $SA^{d1}$ of the input image in the offset analysis window and the spatial activity $SA_1$ of the input image in the analysis window in order to evaluate the block effect in the input image.

The block effect is characterized in two different ways:

intrinsically, that is to say via a function representative of the content of the image and of the image alone.

$BM_2=g_j[f_i(Sa_{d2},SA_2)]$ in a differentiated way, that is to say that it is necessary to compare two values of a function representative of the content of the image: the first calculated on the reference image (input image) and the second on the degraded image (output image).

$BM=g_k[f_j(f_i(SA_{d2},SA_2),f_i(SA_{d1},SA_1))]$, with $i,j,k \in \{1,2\}$ and then $f_1(x,y)=x-y$ or $f_2(x,y)=x/y$ $g_1(x)=100.|x|$ or $g_2(x)=100.|\log(|x|)|$ In particular, the formula $$BM_2 = 100 \cdot \frac{SA_{d2}(t)}{SA_1(t)}$$

is used.

Stage f advantageously implements the determination of a block-effect indicator BM, according to the following formula:

$$BM = \frac{SA_{d2}/SA_2}{SA_{d1}/SA_1} \times 100$$

BRIEF DESCRIPTION OF THE DRAWINGS

Other characteristics and advantages of the invention will emerge better on reading the description which will follow, given by way of non-limiting example, in connection with the attached drawings, in which.

DETAILED DESCRIPTION

Figure 1:
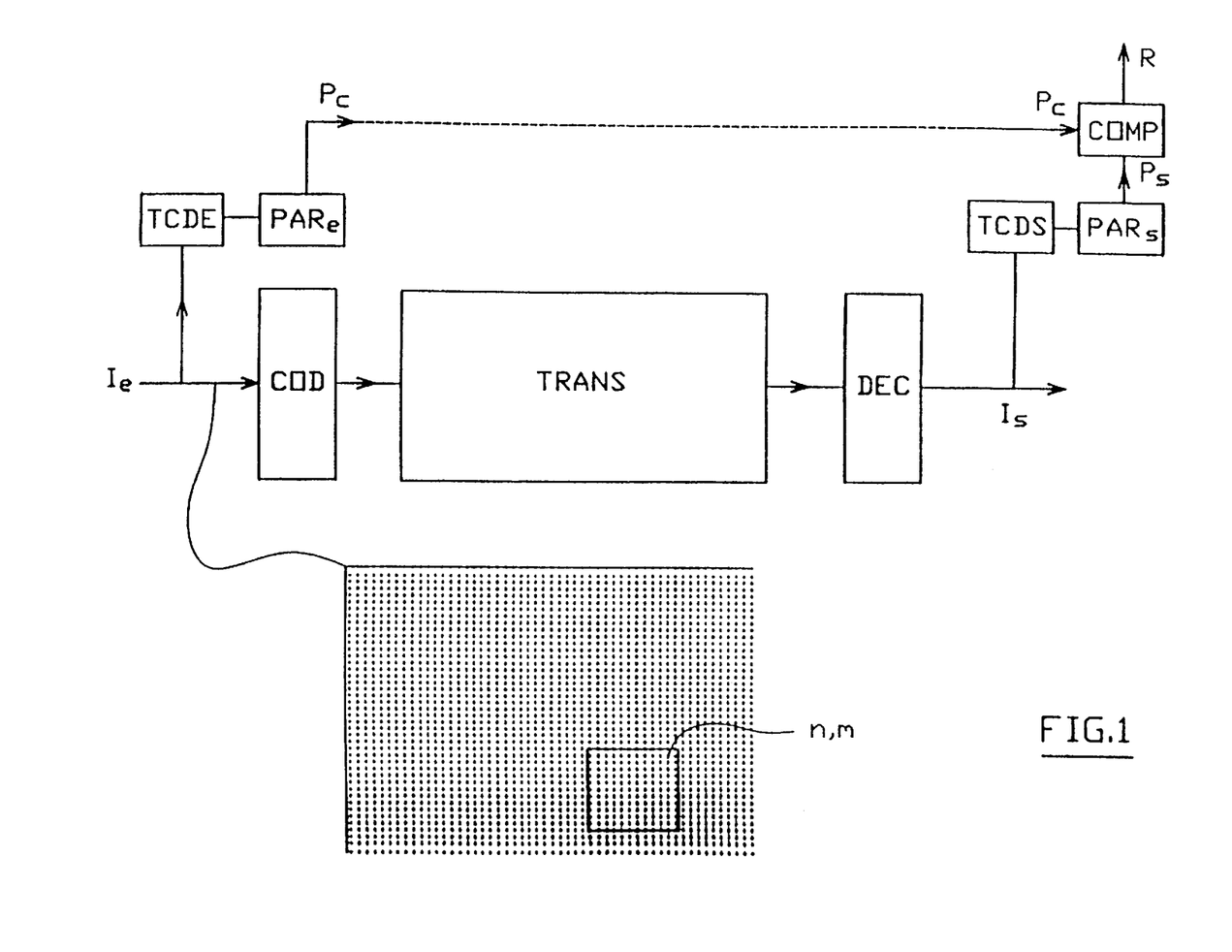
FIG. 1 is a diagrammatic representation of a device for implementing the method according to the present invention.

According to FIG. 1, input images $I_e$ are coded by a coder COD and transmitted by a transmission system TRANS, for example a satellite transmission system, then decoded upon reception by a decoder DEC in order to give a decoded output image $I_s$. A circuit TCDE applies, by way of example, a discrete cosine transform to the input image $I_e$ and a circuit PARE determines the parameters Pe of the input image $I_e$ which will be useful for the evaluation to be carried out. Likewise, a circuit TCDS applies, by way of example, a discrete cosine transform to the output image $I_s$ and a circuit PARS determines the parameters $P_s$ of the output image $I_s$ which will be useful for the evaluation to be carried out.

A comparison circuit COMP performs comparisons between the evaluation parameters Pe and $P_s$ and produces, as output, evaluation results R. The parameters Pe are sent to the output via the TRANS system or independently of it. Alternatively it is possible to make the parameters Ps "rise" to the input so that they are compared there with the parameters Pe.

It will also be noted that it is possible to use the DCT coefficients available with the coder COD and/or the decoder DEC, but then the evaluation will not take account of the defects in the coder COD and/or in the decoder DEC.

The bidirectional discrete cosine transform DCT makes a block of N×N coefficients of the transformed domain correspond to a block of N×N pixels (generally N=8) of the pixel space. The former coefficients express the frequency representation of the amplitude of the luminance of the pixels.

The DCT transform has coefficients F(u,v) in which:

u,v=index of the horizontal and vertical spatial frequency, x,y=index of the horizontal and vertical position of the pixel in the block, f(x,y) represents the luminance of the pixel at the point (x,y) in the image, F(u,v) represents the transformed coefficient at the point (u,v) of the transformed domain, with u, V, X, y varying from 0 to N−1 (N=8).

The parameters made use of to represent the degradations contained in the coded digital images, particularly in MPEG2, use this transformation.

Spatial information is supplied from the transformed domain by the calculation of the overall spatial activity SA of the image. This parameter gives precise information on the details in the image signal $(I_t)$ indexed at the instant t. $(I_t)$ contains (H×W) blocks of pixels. The size of the block $f_{nm}(x,y)$ is 8×8 pixels (see FIG. 1).

In the first place, the block DCT transform is applied to the image entirely, or partially (over an area of interest or analysis window). The first factor representative of the content of the image, the spatial activity, is obtained from the DCT transformed image $(I_t)$. A spatially very active image block has a consequential representation in the transformed domain. Its coefficients have substantial amplitude and spectral distribution.

Two parameters are introduced, the block spatial activity (bsa) and the image spatial activity $SA(I_t)$. They represent the intra-block and intra-image spatial activity respectively.

The content analyzed is that of each block of pixels $f_{nm}(x,y)$ at position n,m in the image $(I_t)$.

The indicator ($bsa_{n,m}$) for the block n,m takes account of the alternating components of the block of transformed coefficients $F_{n,m}(u,v)$.

This gives:

$$bsa_{n,m} = bsa(f_{n,m}(x, y)) = \left(\sum_{i=0}^{7}\sum_{j=0}^{7}(F_{n,m}(i, j))^2\right) - (F_{n,m}(0, 0))^2$$

$SA(I_t)$ is the expression of the overall content of the image (or of the analysis region). It is calculated via an average of the spatial activities ($bsa_{n,m}$) of the blocks in question.

$$SA(I_t) = \overline{bsa_{n,m}(I_t)} = \frac{1}{H \times W}\sum_{n=0}^{H-1}\sum_{m=0}^{W-1} bsa(f_{n,m}(x, y))$$

in which (H×W) is the number of blocks of pixels of the image or of the analysis window.

The overall spatial activity indicator $SA(I_t)$ makes it possible to describe the richness of the image. This parameter is affected by the throughput-reduction coding and by the transmission errors. The comparison of the same parameter calculated at the input and at the output of a digital video system contributes to the identification of the degradations generated by the system. This parameter is representative of the degradations generated by the system, but without the drawback of a compensation between defects. In fact, on the one hand, the calculation carried out by blocks eliminates the block effects and, on the other hand, the losses of information and the false contours are conveyed in the transform by effects of a loss of high frequencies, and these two phenomena thus act in the same sense.

The time-based change in $SA(I_t)$ represents the events which have appeared in the video sequence. Furthermore, this parameter is affected by the throughput-reduction coding and by the transmission errors. The comparison of the same parameter calculated at the input and at the output of a digital video system is carried out on an image It indexed at the instant t. It contributes to the identification of the degradations generated by the system. The mathematical formulation used for the comparison is:

$$\log\_\text{ratio}(I_t) = \log_{10}\left[\frac{SA(I_t)_e}{SA(I_t)_s}\right]$$

The definitive parameter for measuring the degradation relating to the loss of information is the MLR parameter:

$$MLR_M = \text{Maximum}_M[\log\_\text{ratio}(I_t)]$$

This indicator is calculated over a sequence of M images. This option makes it possible to have restricted information relating to a period of time. It makes it possible to have a quality score over: T=M×1/25 seconds, or more generally T=M/NI, NI designating the number of images per second.

The procedure for calculating the loss of information is presented as follows, for example:

a) selection of an image at the input to the system, b) calculation of $SA(I_t)_e$ for this image, c) indexing of this image with its time stamp and its associated $SA_e$ parameter, d) forwarding of reference parameters to the output of the system, f) calculation of $SA(I_t)_s$ for this image, g) calculation of the log_ratio($I_t$) for each image $I_t$, h) calculation of the quality score MLR for each sequence of M images.

It will be noted that the method could also be implemented by making the values of SA calculated for each output image "rise" back to the input.

One advantage of the method is that each image at the input and at the output is characterized by the value of the parameter SA, which means that it is only necessary to forward a single data item per image, as parameter Pe, in order to characterize the degradations (other than the block effect), in contrast to the methods of the prior art which required a large amount of data to be forwarded making it possible to perform a comparison by pixel-to-pixel difference between the reference and degraded images.

The comparison performed on the basis of the MLR factor conveys a measure of the quality of the final images and consequently gives information on the performance of the coding system employed upon transmission.

In order to validate the relevance of the MLR factor, we have contrasted the results obtained with the scores obtained by panels of representative persons during subjective tests. The high coefficient of correlation obtained between the objective and subjective evaluation demonstrates to us the effectiveness of such a parameter.

In the video sequences coded at low throughput, the distortion by block effect is manifested as discontinuities in the content of the image at the boundaries of the adjacent blocks. This artificiality is visible in regions of low or high spatial activity and also in areas of high or low' brightness. It is due to an independent inter-block coding and to a coarse quantization of the content of each block. The DC component F(0,0) of the DCT transform represents the average of the luminance values of a block. The coding of the DC coefficients of two spatially adjacent blocks, at substantially different values, is one of the causes of this degradation. The other transformed coefficients, which represent the alternating components, convey the various changes contained in the block. The coding and the coarse quantization of these coefficients also generate the block effect in the regions of the contours. Errors in the digital stream have an influence on the movement compensation. This is conveyed by an effect at the level of the blocks or of the macroblocks.

According to the invention, a parameter for measuring the block effect employs a comparison of two calculated parameters at each end of the video system.

The proposed indicator makes it possible to evaluate the importance of the erroneous visual information contributed by the structured grid of 8×8 blocks which is visible in the images at system output.

The borders of the 8×8 blocks or the discontinuities of contours are regarded as perceptible and additional information in the image. Knowing that the coding is carried out independently for the adjacent blocks, the losses of information internal to the blocks generates discontinuities in content, or even the appearance of new contours on the borders.

Figure 2:
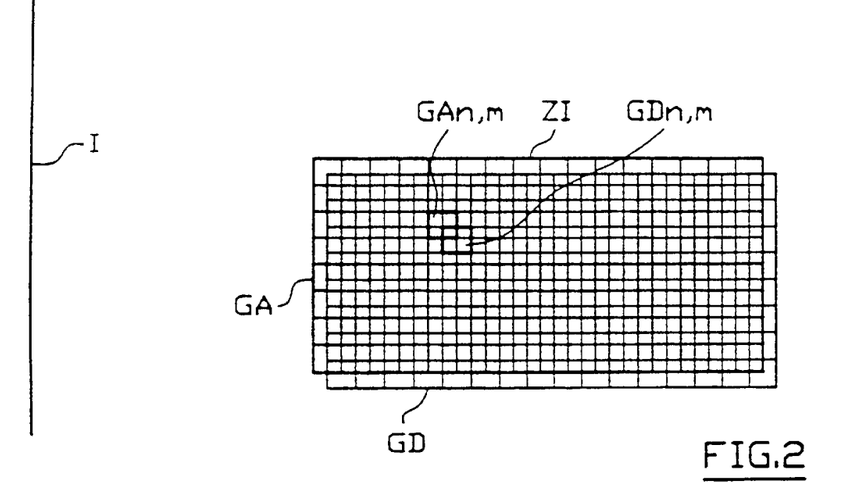
FIG. 2 represents an aligned grid for calculating the evaluation parameter SA and an offset grid for calculating the parameter $SA_d$.

A method adapted to this degradation according to the invention is based on the calculation of two parameters: the overall spatial activity SA (see above) and the offset overall spatial activity $SA_d$ (see FIG. 2).

The parameter SA remains unaffected by the block effects, since it is produced on the basis of these same blocks and in such a way as to be aligned to their grid. In order to stress the contribution of the contours and of the defects around the blocks, the offset spatial activity $SA_d$ is determined. This makes it possible to highlight the artificialities at the borders. On the basis of the same definition of SA, $SA_d$ is calculated preferably with an offset of N/2=4 pixels horizontally and N/2=4 pixels vertically. It will be noted that the offset spatial activity $SA_d$ can be calculated by performing an offset of 1 to N−1 pixels (and preferably N/2 pixels) only in the horizontal direction, or only in the vertical direction, in such a way as to evaluate the horizontal block effect or else the vertical block effect.

The two parameters are the outcome of a sum over the area of interest or over the entire image. A comparison between the two indicators highlights the contribution from the information of the contours at the edge of the blocks. A new parameter is therefore introduced, $SA_{ratio}$, in the following equation.

$$SA_{ratio}(t) = 100 \cdot \frac{SA_d(t)}{SA(t)}$$

$SA_{ratio}$ is sensitive not only to the contours or discontinuities at the edges of the blocks, but it is also so to the original content of the blocks. It is consequently necessary, in order specifically to measure the degradation introduced by a video system, to extract therefrom the information contributed by the original content of the image.

The definitive indicator for measuring and detecting the block effect introduced by a video system is calculated from the values $SA_{ratio}$ which are obtained at the input and at the output of the said system.

These values are regarded respectively as value of the reference signal at the input ($SAratio_e$) and value of the degraded signal at the output ($SATratio_s$). The indicator of the block effect BM is defined by the following equation.

$$BM_{SA} = 100 \cdot \frac{SAratio_e}{SAratio_s}$$

The method for detecting the block effect can be implemented as follows, for example:

a) selection of an image at the input to the system, b) calculation of $SA(I_t)_e$, $SA_d(I_t)_e$ and $SA_{ratio}(I_t)_e$ for this image, c) indexing of this image with its time stamp and its associated parameter, d) forwarding of reference data to the output of the system, e) identification of the same image indexed at the output of the system f) calculation of $SA(I_t)_s$, $SA_d(I_t)_s$ and $SA_{ratio}(I_t)_s$ for the same image at the output of the system, g) calculation of the $BM_{SA}$ for each image $I_t$, h) calculation of the average of BMSA for each sequence of M' images (with M'=M, for example). This score describes the sequence for the degradation in question.

Figure 3:
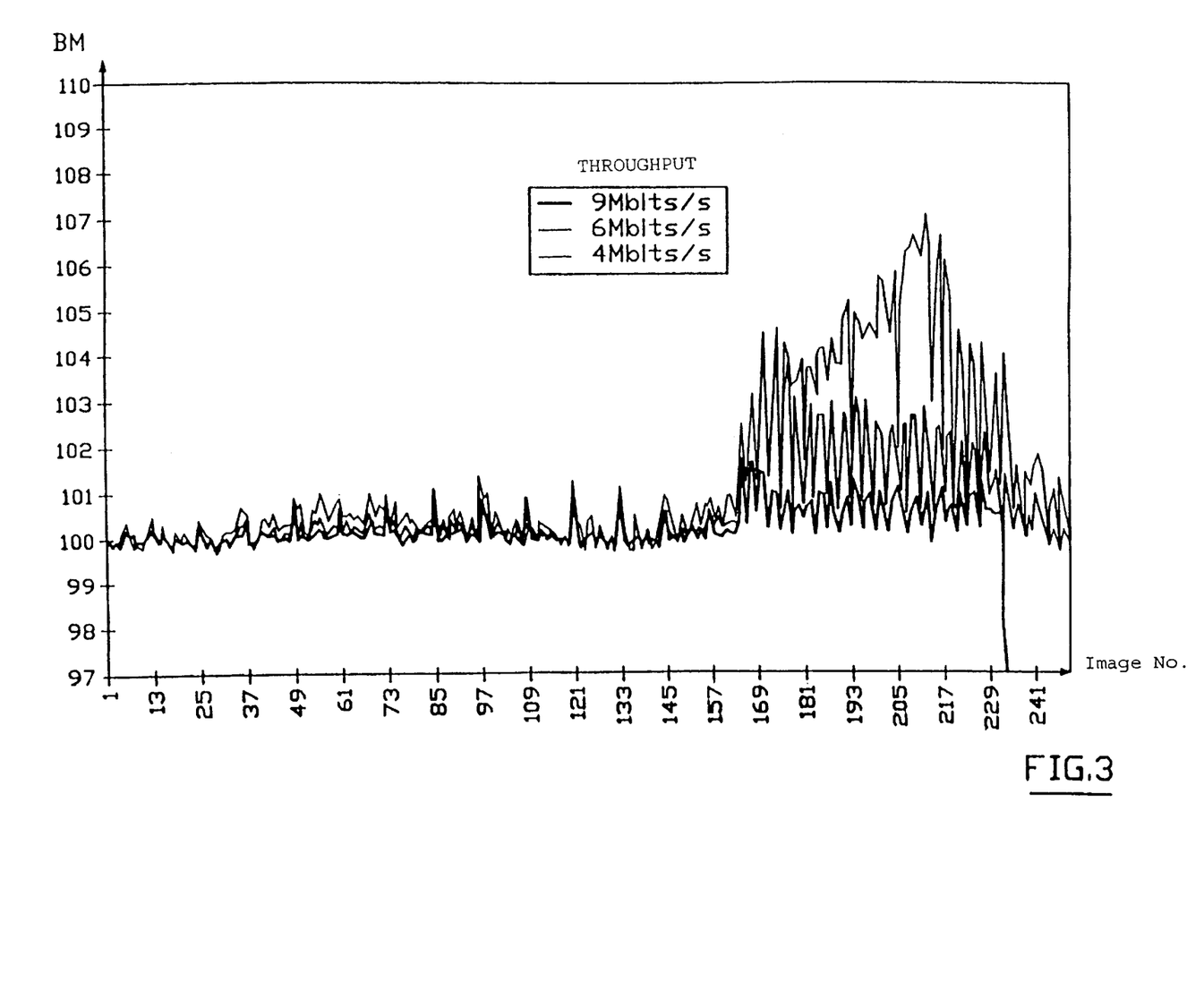
FIG. 3 represents the change in the parameter BM in the course of a particular filmed sequence, and FIGS. 4a to 4c respectively represent the time-based change in the parameter SA (4a) and the DCT applied to the M successive samples of SA (4b) and 4c).

FIG. 3 demonstrates the decreasing size of $BM_{SA}$ for 4, 6 and 9 Mbits/s respectively. This comment is valid especially in the last part of the video sequence. In fact, during this period, the spatial and time-based content of the sequence chosen changes abruptly. This causes a lowering in the quality of the final images due to a reduction in throughput. Coding by quantization of the DCT coefficients causes the block effect to appear, and this is all the more so the coarser the coding.

The degradations in the, coded digital image sequences have spatial or time-based forms. In fact, errors in coding or in transmission may affect the spatial content: contours, objects and structures contained in the signal. However, they can also contaminate the time-based changes of the video sequence: jerks, freezing of images or erroneous shifting of objects.

In order to identify the time-based degradations which impair the video sequences, we have defined a supplementary parameter called "Time-based Activity" TA. It conveys the changes in the content of the image sequences over time. It is sensitive to the various events which may occur and affect the signal.

Figure 4A:
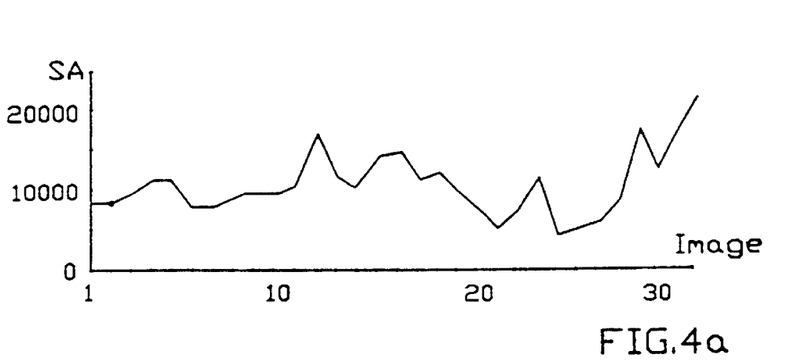

The spatial indicator $SA(I_t)$ conveys the content of the current image in the sequence at an instant t. The time-based variations in $SA(I_t)$ represent the time-based changes in the content of the image and thus they convey the changes which have occurred (see FIG. 4a).

The unidimensional signal $SA(I_t)$ of overall spatial activity of the image is proportional to the richness of the content. In the unidimensional case, the DCT is a transformation which makes a series of M frequencies correspond to a set of M points f(x). It is defined by:

$$F(u) = \sqrt{\frac{2}{N}} \, c(u) \sum_{x=0}^{N-1} f(x) \cos\left(\left(\frac{2x+1}{2N}\right)\pi u\right)$$

$$c(u) = 1/\sqrt{2} \quad \text{if } u = 0$$

$$c(u) = 1 \quad \text{if } u \neq 0$$

$$F(0) = \sqrt{\frac{2}{N}} \, c(0) \sum_{x=0}^{N-1} f(x)$$

Over any window of M time-based samples of the signal $SA(I_t)$, a discrete cosine transform DCT is applied. This new representation conveys the time-based frequencies of the signal and consequently the activity of the image sequence. The first spectral line F(0) is the DC component, the other spectral lines F(u) with u≠0 are the alternating components.

The DC component of the spectrum gives information on the average value of the richness of the content over M images. The alternating frequencies give information on the time-based variations in the content. Only the amplitude of the spectral lines is taken into consideration.

$$TCD_T = TCD(SA(I_t)) = \{F_0(u) \, u=0 \ldots M-1\}$$

Figure 4B:
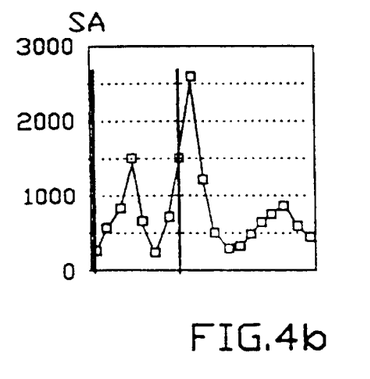
Figure 4C:
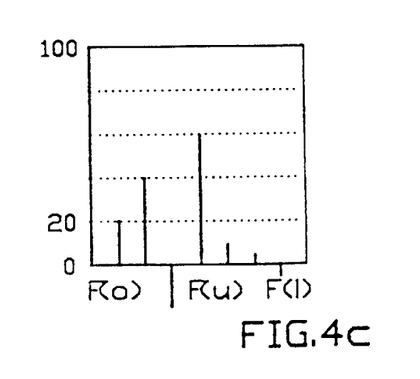

The $DCT_T$ spectrum (see FIG. 4c) of the signal SA (see FIG. 4b) gives information on the time-based changes in the video sequence and consequently expresses any degradation altering these changes. F(0) by definition represents the average of the $SA(I_t)$ signal over the M output images under consideration in the sequence. The amplitudes of the alternating components $F(u)_{u≠0}$ convey the way in which the content of the video changes: rapid variations (video clips), slow changes ("travelling"), fixed planes, etc. In order to make use of the properties of the analysis in the transformed domain, a parameter TA has been defined. It is calculated for a group of M images.

$$TA = \sqrt{\sum_{u=1}^{M-1} F_{SA}^2(u)}$$

TA indicates the amplitude of the fluctuations in the activity SA in the sequence. It conveys any time-based event of the sequence and consequently: the breaks in, and freezing of, images. TA is compared with a given threshold $S_1$ established empirically, below which it is considered that a break in or freezing of images is occurring.

The method of detecting breaks in and freezing of, image can be employed, for example as follows:
a) selection of a group of images,
b) calculation of $SA(I_t)$ for each image,
c) calculation of the $DCT_T$ and of TA
d) —if TA<$s_1$ and if F(0)<$S_2$, then the group of images is a succession of the same uniform image (in practice, blackout).
   if TA<$s_1$ and if F(0)>$S_2$, then the group of images is a succession of the last non-erroneous image frozen by the decoder.
   if TA>$s_1$, return to a.

The phenomenon of freezing of images is a characteristic degradation which appears during errors over the complete system for distributing the television signal. The time-based activity parameter TA is applicable in this particular case. In fact, it detects this event which is related to the strategy of the decoder. The freezing of images takes two forms:
1. restoration of the last non-corrupted image data,
2. visual display of a uniform image (often black), this lasting as long as the data received are unusable.

The MPEG coding family introduces the notion of group of images ("Group of Pictures, GOP"). This structure of the sequence is related to a syntax defining the predictive algorithms with throughput reduction which are applied to each image (images coded without prediction: Intra I, unidirectional predictive images P, bidirectional predictive images B). The particular feature of each image has an influence on the aspect of the impact of the various errors which affect it.

The indicator defined here conveys the time-based events which occur during the video sequence. It consequently makes it possible to identify and to count up the time-based breaks in the sequences. At the same time, it represents a parameter for qualification of the quality of the service.

The invention is not limited to the embodiments described. In particular, the block effect could be evaluated intrinsically on the output image. The method is then characterized in that it includes the following stages:
d1) determining the overall spatial activity $SA_{d2}$ of the output image in an offset analysis window exhibiting blocks of image points or pixels which are shifted by at least one pixel in the direction of the lines of the image and/or in a direction perpendicular to the direction of the lines of the image with respect to the said blocks of pixels of the said analysis window, this determination implementing the following sub-stages:
   i) applying the said block transform to each offset block (n,m) of the said set of blocks of pixels of the offset analysis window in order to determine the transformed coefficients $F_d n,m\,(i,j)$,
   ii) determining, on the basis of the transformed coefficients $F_d n,m\,(i,j)$ of the offset blocks, the spatial activity $bsa_d$ of each block of the said set of offset blocks,
   iii) determining the overall spatial activity $SA_{d2}$ of the set of offset blocks constituting the offset analysis window,
e1) comparing the overall spatial activity $SA_{d2}$ of the output image in the offset analysis window and the overall spatial activity $SA_2$ of the output image in the analysis window.

The invention can be implemented using linear and/or orthogonal block transforms such as the discrete cosine transform DCT, the discrete sine transform, the Fourier transform, the Haar transform, the Hadamar transform, the Slant transform or else a wavelet transform (DWT) the coefficients of which have been reorganized in order to obtain the transformed blocks.

What is claimed is:

1. A method of evaluating the degradation of a video image coded by blocks of pixels, this degradation being generated by a coding and/or storage and/or transmission system producing an output image on the basis of an input image, the method comprising:

a) selecting an input image and determining a spatial activity of the input image in an analysis window representing at least one part of the image which exhibits a set of said blocks of pixels, this determination implementing the following sub-stages:
      i) determining, for each block of the said set of blocks of pixels, transformed coefficients via a block transform according to the blocks,
      ii) determining, on the basis of the transformed coefficients the spatial activity of each block of the set of blocks of pixels, and
      iii) determining, on the basis of the spatial activity of each block, the overall spatial activity of the set of the blocks of pixels constituting the analysis window
   b) selecting the output image corresponding to the input image and determining the said overall spatial activity of the output image in the analysis window, by implementing sub-stages a i) to a iii) for the output image; and
   c) comparing the overall spatial activity of the output image in the analysis window and the overall spatial activity of the input image in the analysis window.

2. A method according to claim 1, wherein the spatial activity of a block is determined by the following formula:

$$bsa_{n,m} = \left(\sum_{i=o}^{7}\sum_{j=0}^{7}(k(i,j) \cdot F_{n,m}(i,j))^p\right) - (k(0,0) \cdot F_{n,m}(0,0))^p$$

where $bsa_{n,m}$ is the spatial activity of a block, $k(i,j)$ is a constant coefficient for a weighting component $(i,j)$ used, and p is a constant.

3. A method according to claim 2, wherein the spatial activity of the set of blocks can then be terminated by the following formula:

$$SA = \overline{bsa_{n,m}} = \frac{1}{H \times W}\sum_{n=0}^{H-1}\sum_{m=0}^{W-1} bsa_{n,m}$$

where SA is the spatial activity of the set of blocks and (H×W) represents the number of blocks of pixels in the analysis window.

4. A method according to claim 3, wherein the act of comparing is carried out with the aid of a parameter LR defined in the following way:

$$LR = g_j[f_i(SA_1, SA_2)] \text{ with } i,j \in \{1,2\}$$

with $f_1(x,y) = x-y$ or $f_2(x,y) = x/y$ and $g_1(x) = 100.|x|$ or $g_2(x) = 100.|\log(|x|)|$.

5. A method according to claim 4, wherein the calculation of the parameter LR over a sequence of input images and of corresponding output images, and the calculation of an evaluation parameter MLR is defined in the following way:

$$MLR = \text{maximum}_m(LR).$$

6. A method according to claim 1, further comprising the determination of a time-based activity indicator for a group of images, determined in the following way:

$$TA = \sqrt{\sum_{u=1}^{M-1} F_{SA}^2(u)}.$$

where TA is the time-based activity indicator, and FSA(u), for u varying from 0 to M−1, designates the M coefficients of a block transform applied to M time-based samples of the spatial activity.

7. A method according claim 6, further comprising, comparing the time-based activity indicator with a given threshold, so as to determine the presence of a break in or freezing of the image.

8. A method according to claim 1, further comprising:

d) determining the overall spatial activity of the output image in an offset analysis window exhibiting blocks of pixels which are shifted by at least one pixel in the direction of the lines of the image and/or in a direction perpendicular to the direction of the lines of the image with respect to the blocks of pixels of the analysis window, this determination implementing the following sub-stages
      i) applying the block transform of each offset block of the set of blocks of pixels of the offset analysis window in order to determine transformed coefficients,
      ii) determining, on the basis of the transformed coefficients of the offset blocks, the spatial activity of each block of the set of offset blocks,
      iii) determining the overall spatial activity of the set of offset blocks constituting the offset analysis window; and
   e) comparing the overall spatial activity of the output image in the analysis window and the overall spatial activity of the output image in the analysis window.

9. A method according to claim 1, further comprising:

d) determining the overall spatial activity of the input image in an offset analysis window exhibiting blocks of image points with pixels which are offset by at least one pixel in the direction of the lines of the image and/or in a direction perpendicular to the direction of the lines of the image with respect to the blocks of pixels of the analysis window, this determination implementing the following sub-stages
      i) applying a block transform, to each offset block of the set of blocks of pixels of the offset analysis window in order to determine transformed coefficients,
      ii) determining, on the basis of the transformed coefficients of the offset blocks, the spatial activity of each block of the said set of offset blocks,
      iii) determining the overall spatial activity of the set of offset blocks constituting the offset analysis window; and
   e) determining the overall spatial activity of the output image in the said offset analysis window by implementing sub-stages $d_2$ i) to d iii); and f) comparing, on the one hand, the overall spatial activity of the output image in the offset analysis window and the spatial activity of the output image in the analysis window, in order to evaluate the block effect in the output image and, on the other hand, the spatial activity of the input image in the offset analysis window and the spatial activity of the input image in the analysis window in order to evaluate the block effect in the input image.

10. A method according to claim 9, characterized in that stage f implements the determination of a block-effect indicator BM according to the following formula:

$$BM = \frac{SA_{d2}/SA_2}{SA_{d1}/SA_1} \times 100.$$

11. A method according to claim 1, wherein said block transform is a linear and orthogonal transform.

12. A method according to one of claim 1, wherein said block transform is a wavelet transform the coefficients of which have been reorganized in order to obtain transformed blocks.

* * * * *